US010801621B2

(12) United States Patent
Eide et al.

(10) Patent No.: US 10,801,621 B2
(45) Date of Patent: Oct. 13, 2020

(54) HYDRAULIC TOOL FOR USE WITH A CLAMP CONNECTOR

(71) Applicant: VETCO GRAY SCANDINAVIA AS, Sandvika (NO)

(72) Inventors: Arne Olav Eide, Sandvika (NO); Gaute Glomlien, Olso (NO)

(73) Assignee: VETCO GRAY SCANDINAVIA AS, Sandvika (NO)

(*) Notice: Subject to any disclaimer, the term of this patent is extended or adjusted under 35 U.S.C. 154(b) by 0 days.

(21) Appl. No.: 15/738,140

(22) PCT Filed: Jun. 15, 2016

(86) PCT No.: PCT/EP2016/063727
§ 371 (c)(1),
(2) Date: Dec. 20, 2017

(87) PCT Pub. No.: WO2016/207043
PCT Pub. Date: Dec. 29, 2016

(65) Prior Publication Data
US 2018/0172157 A1 Jun. 21, 2018

(30) Foreign Application Priority Data

Jun. 26, 2015 (NO) .................................. 20150849

(51) Int. Cl.
F16H 21/10 (2006.01)
G06G 3/00 (2006.01)
(Continued)

(52) U.S. Cl.
CPC ............. F16J 13/065 (2013.01); B25B 13/06 (2013.01); B25B 13/48 (2013.01); B25B 27/026 (2013.01);
(Continued)

(58) Field of Classification Search
CPC ........ F16J 13/065; B25B 13/06; B25B 13/48; B25B 27/026; F16L 21/06; F16L 37/62; B01J 3/03
See application file for complete search history.

(56) References Cited

U.S. PATENT DOCUMENTS 9,103,473 B2 * 8/2015 Hestetun ................ E21B 43/013
2009/0293969 A1 * 12/2009 Le Devehat ............ B63B 27/24
137/614
2014/0103636 A1 * 4/2014 Hestetun ................ E21B 43/013
285/23

FOREIGN PATENT DOCUMENTS

EP 2 642 171 A1 9/2013
EP 2 722 480 A1 4/2014
(Continued)

OTHER PUBLICATIONS

Karlsen, M.V., et al., Subsea clamp connector and subsea clamp connector arrangement comprising such a clamp connector, GE co-pending Application No. 20160835, filed on May 17, 2016.
(Continued)

Primary Examiner — Jake Cook
(74) Attorney, Agent, or Firm — Baker Hughes Patent Organization

(57) ABSTRACT

A hydraulic tool for use with a clamp connector where a first clamping element and a second clamping element of the clamp connector are pivotable towards each other into a closed position by exerting a pulling force on an operating shaft and a pushing force on a spacer sleeve, and where said first and second clamping elements are lockable in said closed position by tightening a locking nut against a shoulder on the spacer sleeve. The tool includes a pulling element; a hydraulic power unit for moving the pulling element in relation to the spacer sleeve and thereby allow the hydraulic tool to exert a pulling force on the operating shaft and a (Continued)

pushing force on the spacer sleeve; a rotatable actuating member with a socket engageable with the locking nut; and a drive motor for rotating the actuating member to allow the actuating member to rotate the locking nut.

14 Claims, 9 Drawing Sheets

(51) Int. Cl.
*H01Q 3/08* (2006.01)
*F16J 13/06* (2006.01)
*F16L 21/06* (2006.01)
*F16L 37/62* (2006.01)
*B25B 13/06* (2006.01)
*B25B 13/48* (2006.01)
*B25B 27/02* (2006.01)
*B01J 3/03* (2006.01)

(52) U.S. Cl.
CPC ............... *F16L 21/06* (2013.01); *F16L 37/62* (2013.01); *B01J 3/03* (2013.01)

(56) References Cited

FOREIGN PATENT DOCUMENTS

WO 93/04307 A1 3/1993
WO 2007/017559 A1 2/2007

OTHER PUBLICATIONS

Office Action and Search issued in connection with corresponding NO Application No. 20150849 dated Jan. 25, 2016.
International Search Report and Written Opinion issued in connection with corresponding PCT Application No. PCT/EP2016/063727 dated Sep. 28, 2016.
International Preliminary Report on Patentability issued in connection with corresponding PCT Application No. PCT/EP2016/063727 dated Dec. 26, 2017.

* cited by examiner

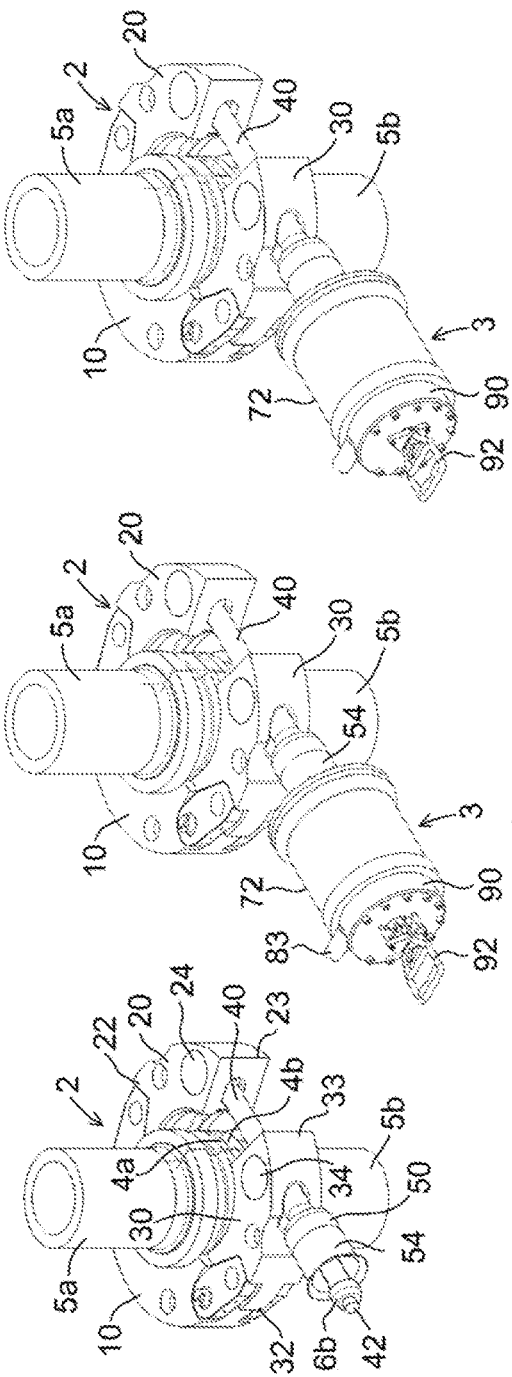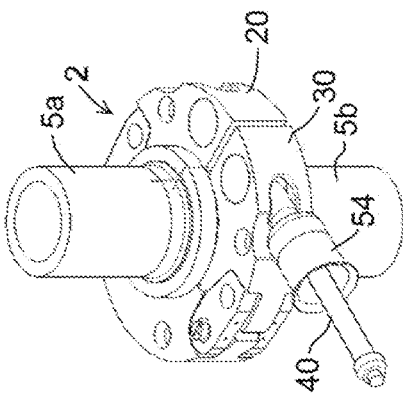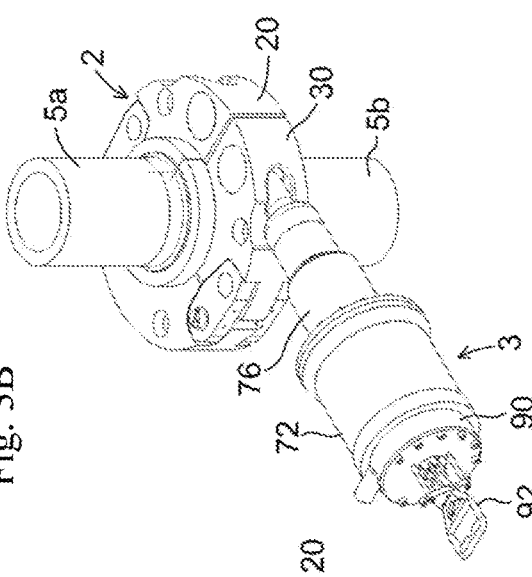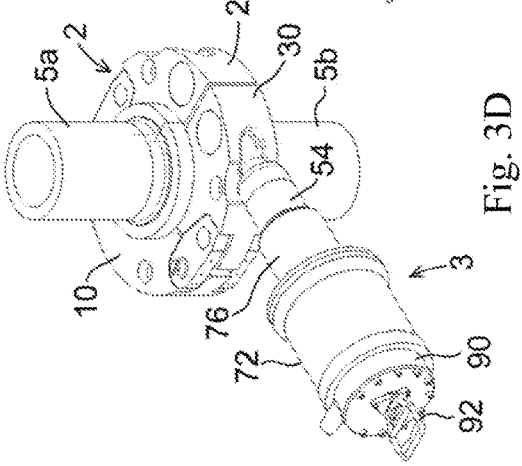

HYDRAULIC TOOL FOR USE WITH A CLAMP CONNECTOR

FIELD OF THE INVENTION

The present invention relates to a hydraulic tool according to the preamble of claim 1. The invention also relates to a clamp connector arrangement comprising such a hydraulic tool.

BACKGROUND OF THE INVENTION

EP 2 642 171 A1 discloses a clamp connector arrangement according to the preamble of claim 14 for connecting and securing an end of a tubular member to an abutting end of another tubular member. This previously known clamp connector arrangement comprises a clamp connector with arc-shaped first and second clamping elements which are pivotable towards each other into a closed position in engagement with the ends of said tubular members by exerting a pulling force on an outer end of an operating shaft, which is fixed to a first trunnion member pivotally mounted to the first clamping element and which is displaceably connected to a second trunnion member pivotally mounted to the second clamping element, and a simultaneous pushing force on a spacer sleeve fixed to said second trunnion member. Said first and second clamping elements are lockable in said closed position by means of a locking member in the form of a segmented nut, which is configured for engagement with an external thread on the operating shaft. The clamp connector arrangement of EP 2 642 171 A1 also comprises a hydraulic tool which is to be used for exerting a pulling force on the outer end of the operating shaft of the clamp connector. A similar clamp connector arrangement is also previously known from WO 93/04307 A1. The clamp connector arrangement of WO 93/04307 A1 comprises a locking nut which is to be rotated by hand.

SUMMARY OF THE INVENTION

An object of an embodiment of the present invention is to provide a hydraulic tool of new and favourable design, which is suitable for use with a clamp connector of the above-mentioned type.

The hydraulic tool of the present invention comprises: a pulling element configured for releasable engagement with an outer end of an operating shaft of the clamp connector; a hydraulic power unit for moving the pulling element in an axial direction in relation to a spacer sleeve of the clamp connector so as to allow the hydraulic tool to exert a pulling force on the operating shaft and a pushing force on the spacer sleeve and thereby pivot first and second clamping elements of the clamp connector into a closed position and bring the operating shaft into a pre-tensioned state; and a torque unit, which comprises: a rotatable actuating member, which is provided with a socket configured for releasable engagement with a locking nut provided on the operating shaft; and a drive motor for rotating the actuating member so as to allow the actuating member to rotate the locking nut and thereby move it into engagement with a shoulder on the spacer sleeve of the clamp connector in order to lock the operating shaft in said pre-tensioned state and thereby lock the first and second clamping elements of the clamp connector in the closed position or any other attained position.

By means of the hydraulic tool of an embodiment of the invention, the operating shaft as well as the locking nut of a clamp connector of the above-mentioned type can be maneuvered in a simple and quick manner by means of one and the same tool.

Further advantages as well as advantageous features of the clamp connector arrangement according to an embodiment of the present invention will appear from the following description.

BRIEF DESCRIPTION OF THE DRAWINGS

With reference to the appended drawings, a specific description of embodiments of the invention cited as examples follows below.

In the drawings.

DETAILED DESCRIPTION

Figure 1:
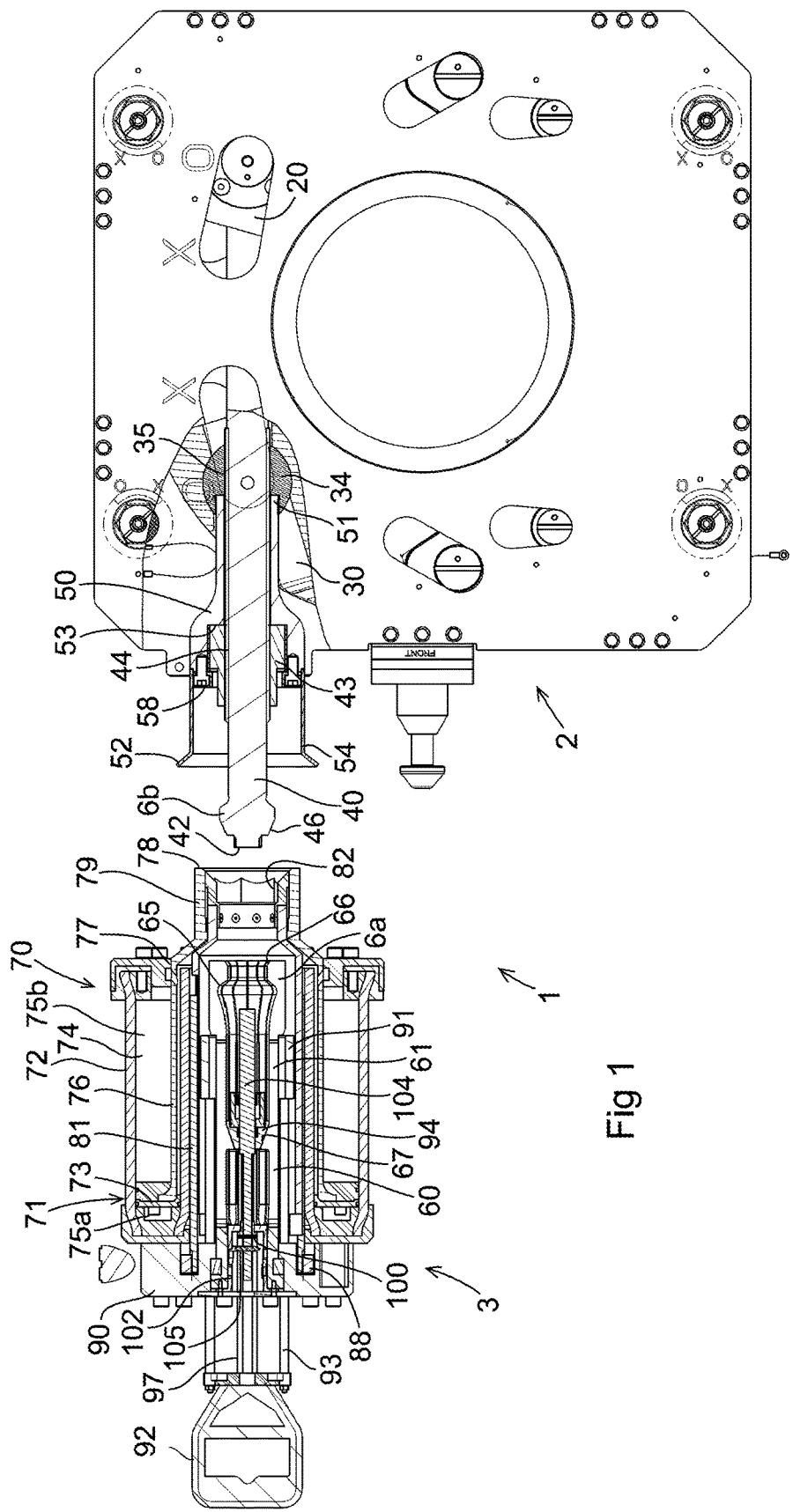
FIG. 1 is a partly cut lateral view of a hydraulic tool according to an embodiment of the present invention and an associated clamp connector.

A clamp connector arrangement 1 according to an embodiment of the present invention is illustrated in FIGS. 1, 3A-3F and 4A-4F. The clamp connector arrangement 1 comprises a clamp connector 2 and a hydraulic tool 3 which are to be used for connecting and securing an end 4A of a tubular member 5a to an abutting end 4B of another tubular member 5b, as illustrated in FIGS. 3A-3F.

For the sake of clarity, the clamp connector 2 is shown in a simplified manner in FIGS. 3A-3F. The clamp connector 2 comprises a base part 10, a first clamping element 20 articulately connected to the base part 10 and a second clamping element 30 articulately connected to the base part 10. In the illustrated example, the base part 10 and the clamping elements 20, 30 are arc-shaped. Each clamping element 20, 30 has a hinged first end 22, 32, through which the clamping element 20, 30 is connected to the base part 10, and an opposite second end 23, 33. A space for receiving the ends 4A, 4B of two tubular members 5a, 5b to be connected to each other is provided between the base part 10 and the clamping elements 20, 30. On the side facing said space, the base part 10 has opposed bevelled wedging surfaces for engaging corresponding bevelled wedging surfaces provided at the abutting ends 4A, 4B of the tubular members to be connected to each other. The respective clamping element 20, 30 has corresponding bevelled wedging surfaces on the side thereof facing said space. The wedging surface of the respective tubular member 5a, 5b is for instance provided on a flange arranged at the end 4A, 4B of the tubular member.

A first trunnion member 24 is pivotally mounted to the first clamping element 20 at the second end 23 thereof, and a second trunnion member 34 is pivotally mounted to the second clamping element 30 at the second end 33 thereof. An operating shaft 40 is connected to these trunnion members 24, 34. The operating shaft 40 has an inner end and an opposite outer end 42, wherein the operating shaft 40 is fixed to the first trunnion member 24 at its inner end. The operating shaft 40 is displaceably connected to the second trunnion member 34 so as to be axially moveable in relation to the second trunnion member. The operating shaft 40 extends through a through hole 35 (see FIG. 1) provided in the second trunnion member 34 and is slidably received in this through hole 35.

A spacer sleeve 50 is connected to the second trunnion member 34 and extends from the second trunnion member 34 on the side thereof facing the outer end 42 of the operating shaft 40. The spacer sleeve 50 has an inner end 51 facing the second trunnion member 34 and an opposite outer end 52. The spacer sleeve 50 surrounds a section of the operating shaft 40. Thus, the operating shaft 40 extends through the spacer sleeve 50 and beyond the ends 51, 52 thereof. The inner end 51 of the spacer sleeve is fixed to or bears against the second trunnion member 34.

The clamping elements 20, 30 are moveable between an open position (see FIGS. 3A-3C) and a closed position (see FIGS. 3D-3F) under the effect of the hydraulic tool 3, which is configured to act on the operating shaft 40. In the closed position, the clamping elements 20, 30 are pivoted towards each other and the wedging surfaces of the base part 10 and the clamping elements 20, 30 are in engagement with the corresponding wedging surfaces of the tubular members 5*a*, 5*b* and thereby keep the ends 4A, 4B of the tubular members tightly clamped to each other. A metallic seal member (not shown) may be provided between the ends 4A, 4B of the tubular members 5*a*, 5*b* in order to seal the joint formed between the ends of the tubular members. In the open position, the clamping elements 20, 30 are pivoted away from each other and do not exert any clamping action on the ends 4A, 4B of the tubular members 5*a*, 5*b*.

The hydraulic tool 3 is connectable to the outer end 42 of the operating shaft 40 and is configured to pull the operating shaft 40 in the axial direction, and simultaneously push the spacer sleeve 50 in the opposite direction, in order to bring the operating shaft into a pre-tensioned condition while moving the second ends 23, 33 of the clamping elements towards each other and thereby pivoting the clamping elements 20, 30 into the above-mentioned closed position. The clamp connector 2 comprises a locking nut 43 (see FIG. 1) for locking the operating shaft 40 in the pre-tensioned condition and thereby locking the clamping elements 20, 30 in the closed position. The locking nut 43 is in threaded engagement with an external thread 44 on the operating shaft 40 at a position between the outer end 42 of the operating shaft 40 and a shoulder 53 (see FIG. 1) on the spacer sleeve 50. The external thread 44 on the operating shaft 40 is in engagement with a corresponding internal thread in the locking nut 43.

Figure 2:
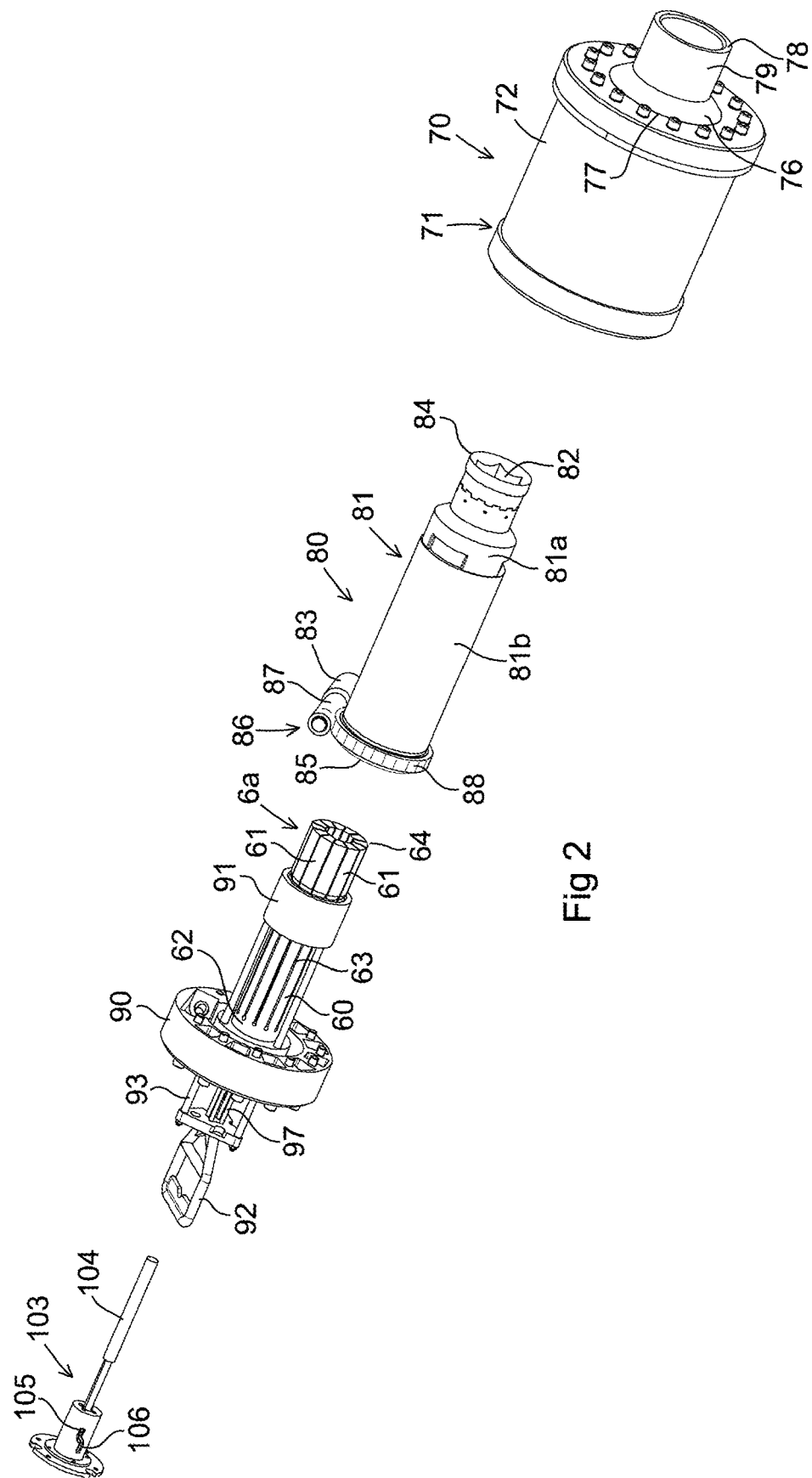
FIG. 2 is an exploded view of the hydraulic tool of FIG. 1, FIGS. 3A-3F are perspective views of the hydraulic tool of FIG. 1 and an associated clamp connector, as seen at different stages during a process of connecting two tubular members to each other.

The hydraulic tool 3 comprises a pulling element 60 (see FIGS. 1 and 2) configured for releasable engagement with the outer end 42 of the operating shaft 40, and a hydraulic power unit 70 for moving the pulling element 60 in an axial direction in relation to the spacer sleeve 50 so as to allow the hydraulic tool 3 to exert a pulling force on the operating shaft 40 and a pushing force on the spacer sleeve 50, and thereby pivot the first and second clamping elements 20, 30 into the closed position and bring the operating shaft 40 into the pre-tensioned condition. The hydraulic tool 3 is also provided with a torque unit 80 (see FIG. 2) comprising a rotatable actuating member 81, which is provided with a socket 82 configured for releasable engagement with the locking nut 43, and a drive motor 83 for rotating the actuating member 81 so as to allow the actuating member 81 to rotate the locking nut 43 and thereby move it into engagement with the shoulder 53 (see FIG. 1) on the spacer sleeve 50 in order to lock the operating shaft 40 in the pre-tensioned condition and thereby lock the first and second clamping elements 20, 30 in the closed position.

The actuating member 81 has the form of a hollow casing and the socket 82 is provided at a front end 84 of the actuating member. The pulling element 60 is located in an inner space of the actuating member 81 and connected to the hydraulic power unit 70 via a connecting member 90, which is fixed to an axially moveable part 71 of the hydraulic power unit 70 and which is provided at a rear end 85 of the actuating member 81. The actuating member 81 is rotatable in relation to the pulling element 60 and the connecting member 90. The actuating member 81 is telescopically extendable so as to allow the length of the actuating member 81 to vary in dependence on the axial movement of said axially moveable part 71 of the hydraulic power unit 70. In the illustrated embodiment (see FIG. 2), the actuating member 81 comprises a cylindrical front part 81*a* and a cylindrical rear part 81*b*, wherein the front part 81*a* and rear part 81*b* are slidably connected to each other. The socket 82 is fixed to the front part 81*a* of the actuating member 81.

The drive motor 83 is for instance a hydraulic, pneumatic or electric motor and is mounted to the connecting member 90. The torque unit 80 comprises a transmission mechanism 86 (see FIG. 2) for transmitting torque from an output shaft 87 of the drive motor 83 to the actuating member 81. In the illustrated embodiment, the transmission mechanism 86 comprises a ring gear 88 which is fixed to the rear part 81*b* of the actuating member 81 at the rear end thereof.

The hydraulic power unit 70 comprises a cylinder housing 72 and an annular piston 73 (see FIG. 1), which is hydraulically actuated and slidably received in an annular piston cavity 74 in the cylinder housing, wherein the piston cavity 74 and the piston 73 surround the actuating member 81. The cylinder housing 72 forms part of the above-mentioned axially moveable part 71 of the hydraulic power unit 70. The hydraulic power unit 70 further comprises a tubular body 76 which is fixed to the piston 73 and extends through an opening 77 at a front end of the cylinder housing 72. A contact surface 78 at a front end of the tubular body 76 is configured to be in contact with a corresponding contact surface 58 on the spacer sleeve 50 when the pulling element 60 is in engagement with the outer end 42 of the operating shaft 40 and the socket 82 of the actuating member 81 is in engagement with the locking nut 43. The actuating member 81 extends through the tubular body 76 and is rotatable in relation to it. A front part 79 of the tubular body 76 is axially insertable into a guide funnel 54 provided at the outer end 52 of the spacer sleeve 50, wherein the above-mentioned contact surface 58 of the spacer sleeve is arranged inside the guide funnel 54.

The piston cavity 74 is divided by the piston 73 into a first chamber 75*a* and a second chamber 75*b*. The first chamber 75*a* is connected to a hydraulic system (not shown) in order to allow feeding of hydraulic fluid, for instance in the form of hydraulic oil, into the first chamber 75*a* and thereby achieve a displacement of the axially moveable part 71 of the hydraulic power unit 70 rearwards in relation to the piston 73 and the tubular body 76. The second chamber 75*b* is also connected to the hydraulic system in order to allow feeding of hydraulic fluid into the second chamber 75*b* and thereby achieve a displacement of the axially moveable part 71 of the hydraulic power unit 70 forwards in relation to the piston 73 and the tubular body 76.

The pulling element 60 is provided with a female-like first coupling member 6*a* which is configured for engagement with a corresponding male-like second coupling member 6*b* arranged at the outer end 42 of the operating shaft 40, wherein the pulling element 60 may be connected to the operating shaft 40 through these coupling members 6a, 6b to thereby allow the hydraulic tool 3 to exert a pulling force on the operating shaft 40 via the pulling element 60. In the illustrated embodiment, the first coupling member 6a comprises several axially extending coupling fingers 61 (see FIG. 2) which are distributed about a center axis of the pulling element 60 and configured to surround the second coupling member 6b when the first and second coupling members 6a, 6b are in engagement with each other. The pulling element 60 comprises a cylindrical base part 62 at its rear end. A rear end of each coupling finger 61 is fixed to the base part 62 and the coupling fingers 61 are separated from each other by longitudinal slits 63 which extend in the axial direction of the pulling element 60 from the base part 62 to the front end 64 of the pulling element. A recess 65 (see FIG. 1) for receiving the second coupling member 6b is provided on the inner side of each coupling finger 61 at the front end thereof. The coupling fingers 61 are moveable in relation to each other in a radial direction, to thereby allow the coupling fingers 61 to be connected to the second coupling member 6b by flexing radially outwards in relation to each other and sliding into engagement with the second coupling member 6b when the pulling element 60 is pushed against the outer end 42 of the operating shaft 40. The second coupling member 6b is provided with a bevelled guide surface 46 which is configured to co-operate with an inclined guide surface 66 at the front end of each coupling finger 61 in order to force the coupling fingers apart and allow the front part of the coupling fingers to slide onto the second coupling member 6b when the pulling element 60 is pushed against the outer end 42 of the operating shaft 40.

The hydraulic tool 3 comprises a sleeve-shaped locking member 91 which surrounds the coupling fingers 61 and which is axially moveable in relation to the coupling fingers 61 between a retracted unlocking position (see FIGS. 1, 4A, 4B, 4E and 4F), in which the coupling fingers 61 are moveable in relation to each other in a radial direction outwards and thereby may be engaged with or disengaged from the second coupling member 6b, and an advanced locking position (see FIGS. 4C and 4D), in which the locking member 91 prevents the coupling fingers 61 from moving in relation to each other in a radial direction outwards and thereby prevents the coupling fingers 61 from being disengaged from the second coupling member 6b. The inner surface of the locking member 91 is in contact with an outer surface of the coupling fingers 61 when the locking member 91 is in the locking position. The locking member 91 is connected to a handle 92 via a number of connecting rods 93, which are distributed around the pulling element 60 and extend in the axial direction of the pulling element 60 on the outside thereof. The connecting rods 93 are slidably mounted to the connecting member 90. The locking member 91 may be axially moved between said unlocking position and locking position by an axial movement of the handle 92 in relation to the connecting member 90.

The hydraulic tool 3 further comprises a wedge member 94 (see FIGS. 1, 4E, 4D and 4F), which is connected to the handle 92 so as to be axially moveable in relation to the coupling fingers 61 together with the locking member 91. The wedge member 94 is received in an inner space of the pulling element 60 between the coupling fingers 61 and is provided with an external bevelled surface configured to act on an inclined inner surface 67 on each coupling finger 61 in order to force the coupling fingers 61 to move in relation to each other in a radial direction outwards when the locking member 91 is moved rearwards from the locking position to the unlocking position, to thereby facilitate a disconnection of the coupling fingers 61 from the second coupling member 6b. The locking member 91 has such a position in relation to the wedge member 94 that the locking member 91 has reached the retracted unlocking position when the wedge member 94 comes into contact with the inclined inner surfaces 67 on the coupling fingers 61. In the illustrated example, the wedge member 94 is connected to the handle 92 via a number of connecting rods 97.

In the illustrated embodiment, the hydraulic tool 3 comprises a locking disc 100 (see FIGS. 1 and 2), which is rotatable in relation to the connecting member 90. The locking disc 100 is non-rotatably fixed to a cylindrical body 102, which in its turn is rotatably mounted to the connecting member 90. The locking disc 100 is rotated by means of an actuating mechanism 103 between a first position, in which the locking disc 100 prevents an axial movement of the handle 92 towards the connecting member 90 and thereby prevents a movement of the locking member 91 from the retracted unlocking position to the advanced locking position, and a second position, in which the locking disc 100 allows an axial movement of the handle 92 towards the connecting member 90 and thereby allows a movement of the locking member 91 from the retracted unlocking position to the advanced locking position. The actuating mechanism 103 comprises an actuating rod 104, which has a rear end received inside the cylindrical body 102 and a front end received in the inner space of the pulling element 60 between the coupling fingers 61. The actuating mechanism 103 further comprises an actuating pin 105, which is fixed to the actuating rod 104 at the rear end thereof and received inside the cylindrical body 102. The actuating rod 104 extends through an axial through hole in the wedge member 94 and is axially displaceable in relation to the wedge member 94 and the pulling element 60. The actuating pin 105 is in engagement with a guide groove 106 provided in the cylindrical wall of the cylindrical body 102. The front end of the actuating rod 104 is configured to come into contact with the outer end 42 of the operating shaft 40 so as to allow the actuating rod 104 to be pushed axially rearwards by the operating shaft 40, when the second coupling member 6b provided on the operating shaft 40 is received in the recesses 65 of the coupling fingers 61 during the movement of the front part 79 of the tubular body 76 into the guide funnel 54 of the spacer sleeve 50. The actuating pin 105 will move rearwards together with the actuating rod 104 and thereby move rearwards along the guide groove 106 while effecting a rotation of the cylindrical body 102 and thereby a rotation of the locking disc 100 from the above-mentioned first position to the above-mentioned second position. Hereby, the locking member 91 can only be moved from its retracted unlocking position to its advanced locking position when the coupling member 6a of the pulling element 60 has been properly engaged with the corresponding coupling member 6b of the operating shaft 40.

The clamp connector arrangement 1 of an embodiment of the present invention is intended for subsea use and the hydraulic tool 3 is intended to be operated by means of an ROV (ROV=Remotely Operated Vehicle).

Figure 4A:
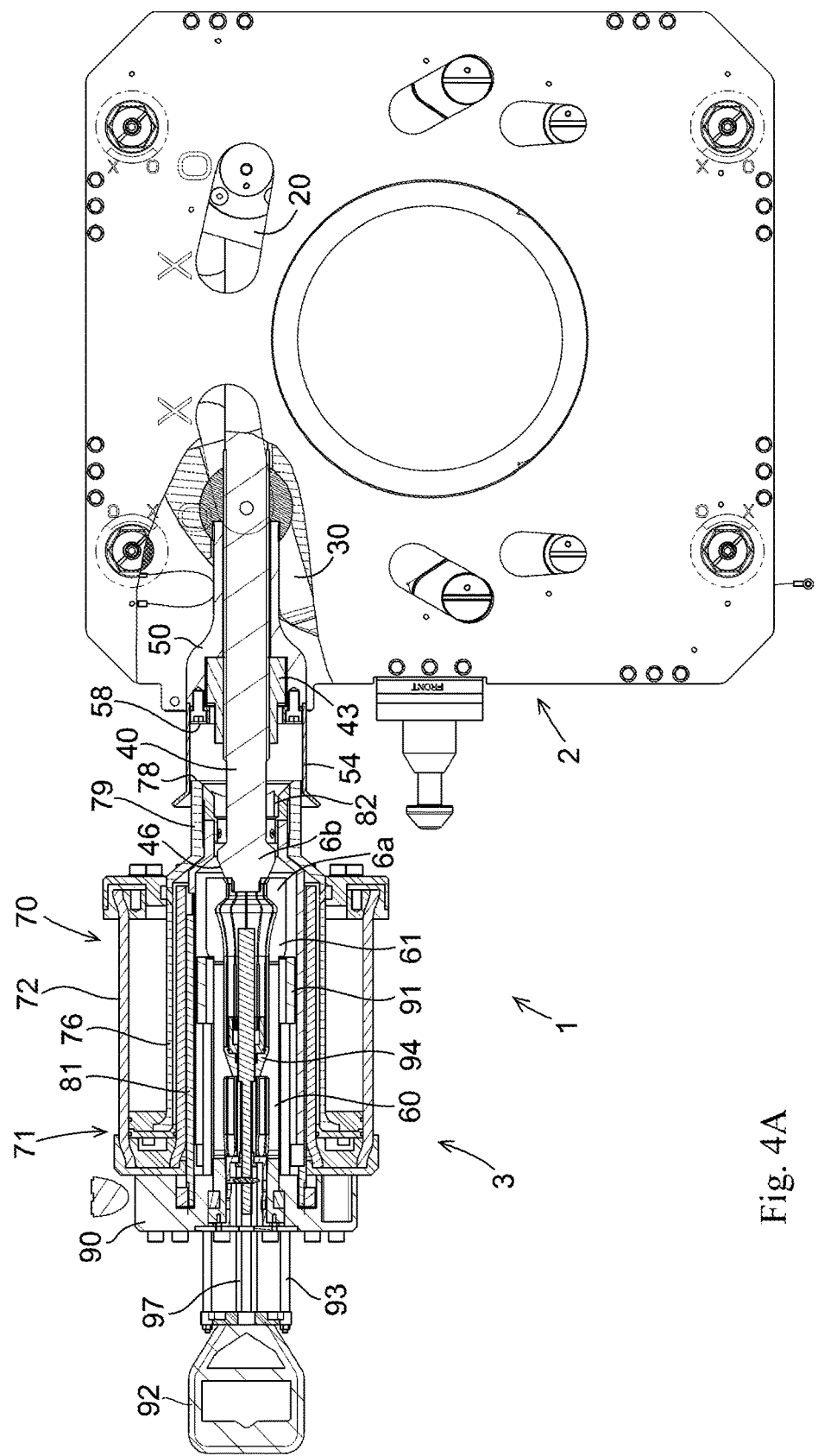
FIGS. 4A-4F are partly cut lateral views of the hydraulic tool and clamp connector of FIG. 1, as seen at different stages during a process of connecting two tubular members to each other.
Figure 4B:
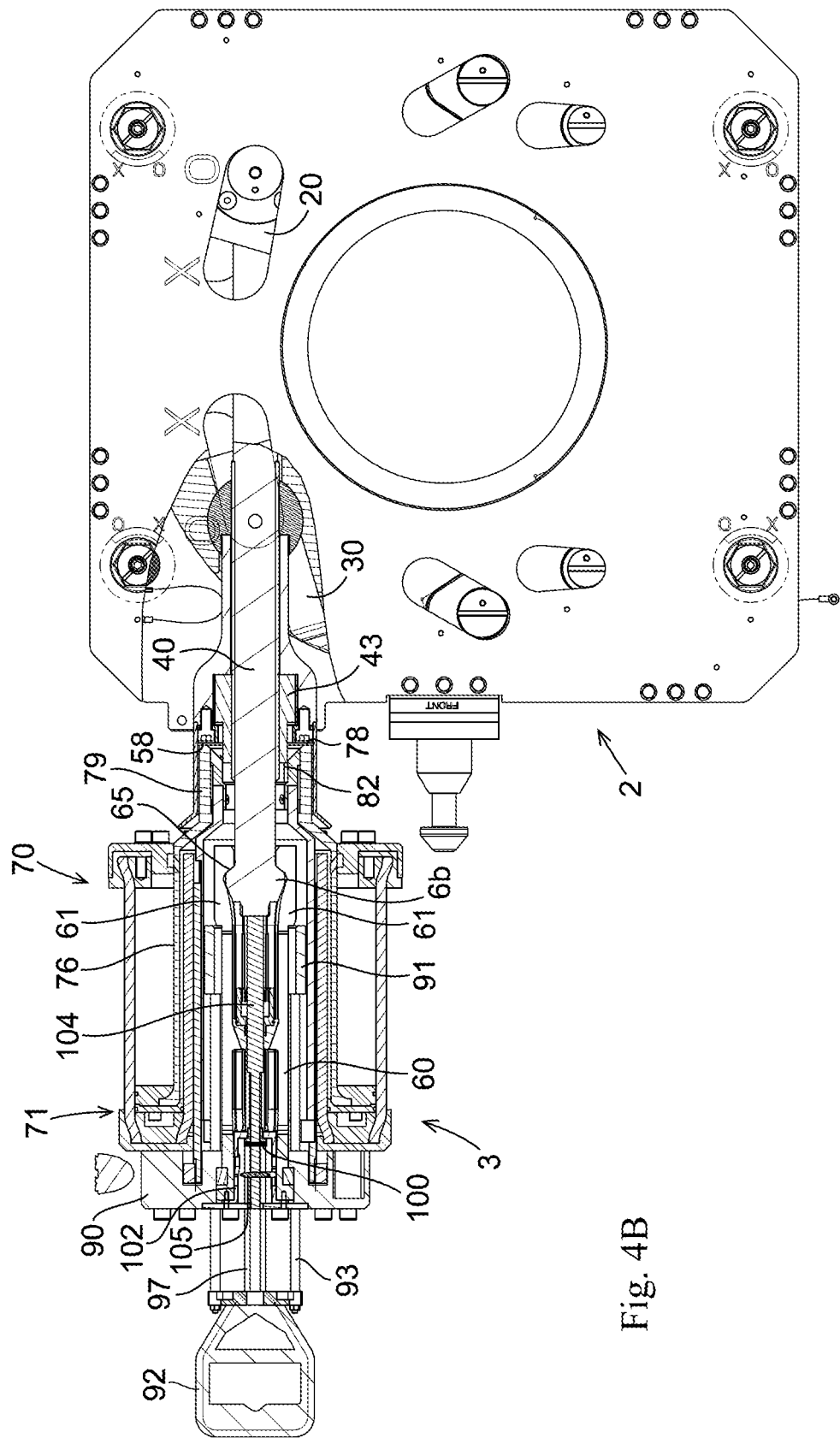
Figure 4C:
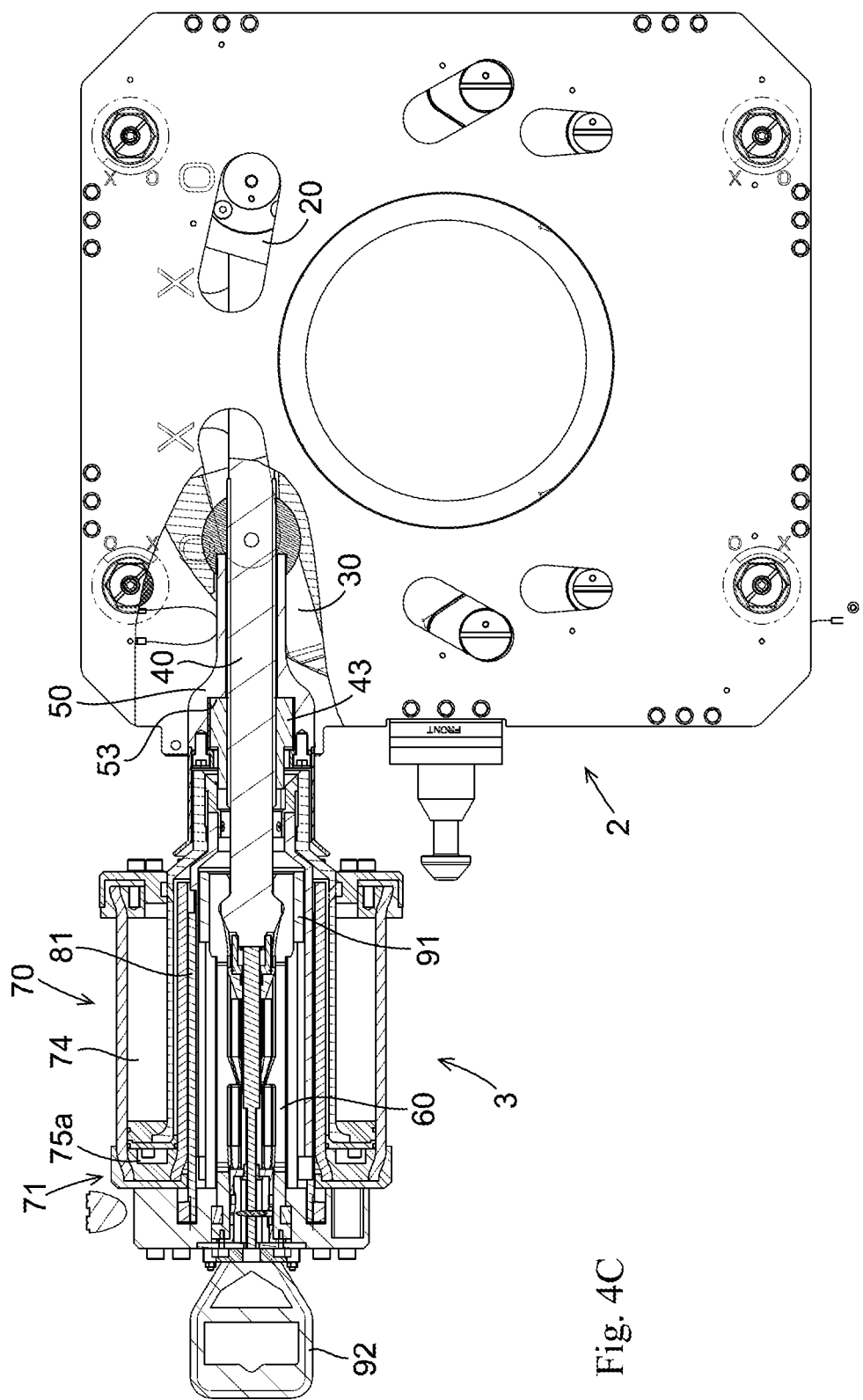
Figure 4D:
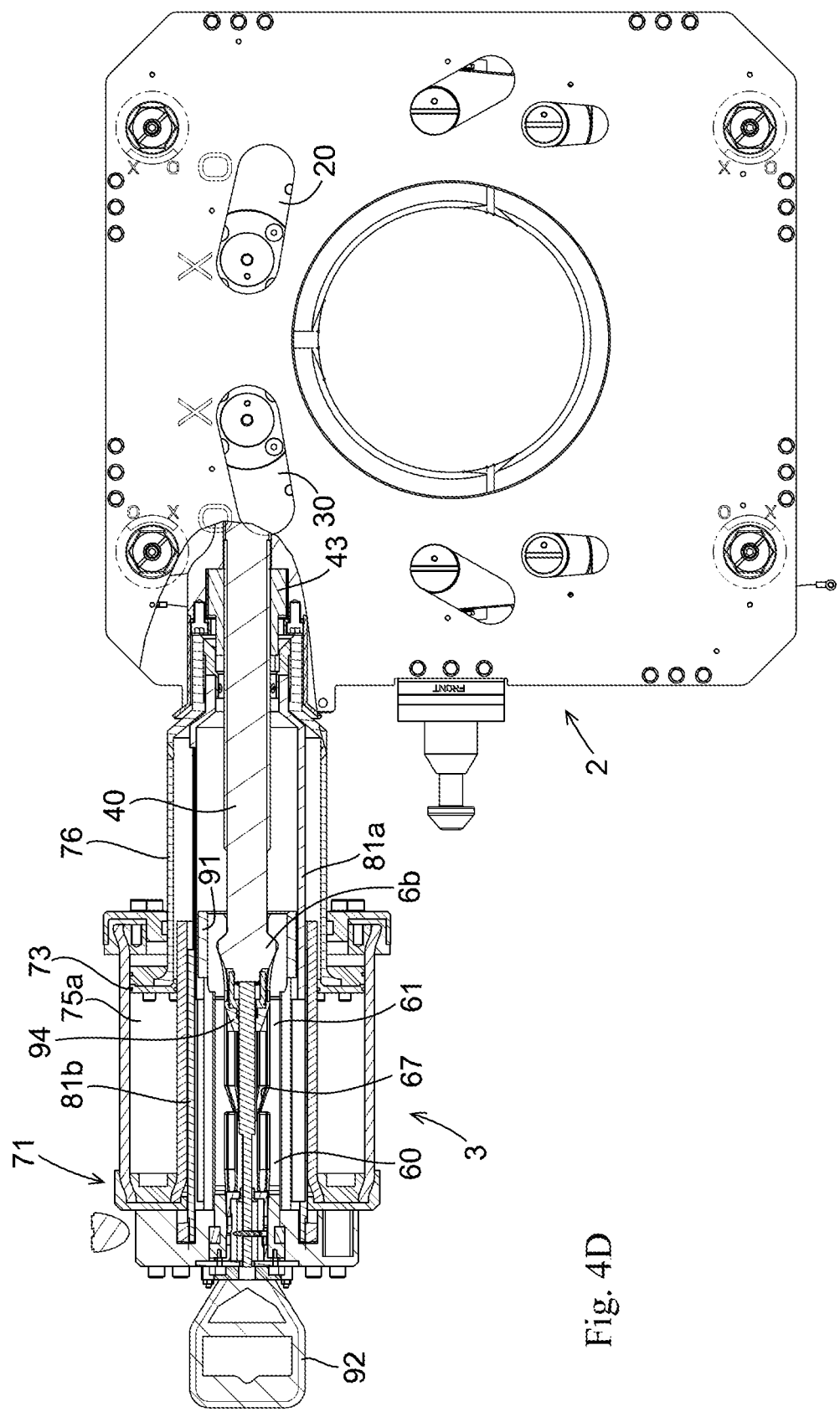
Figure 4E:
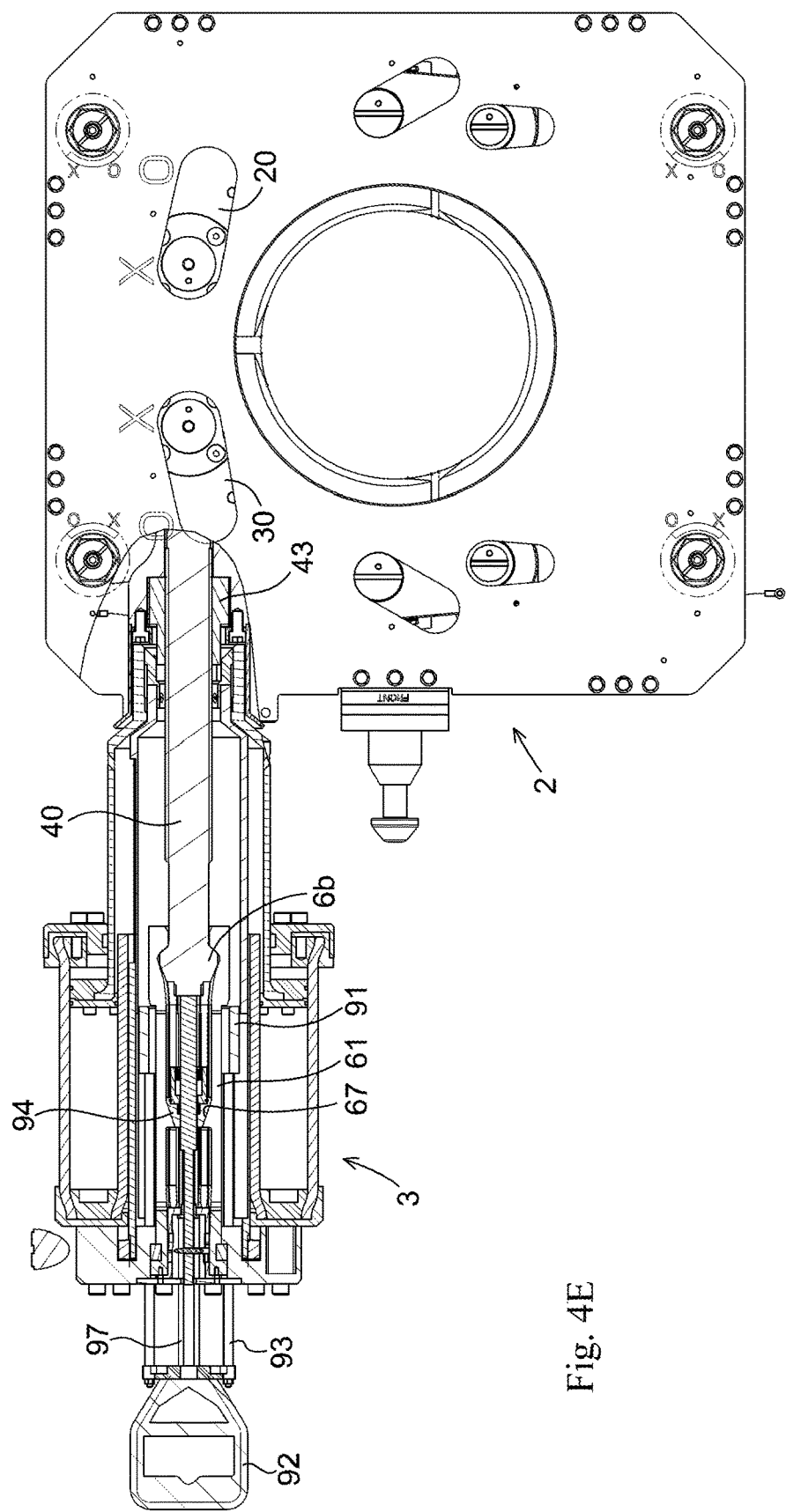
Figure 4F:
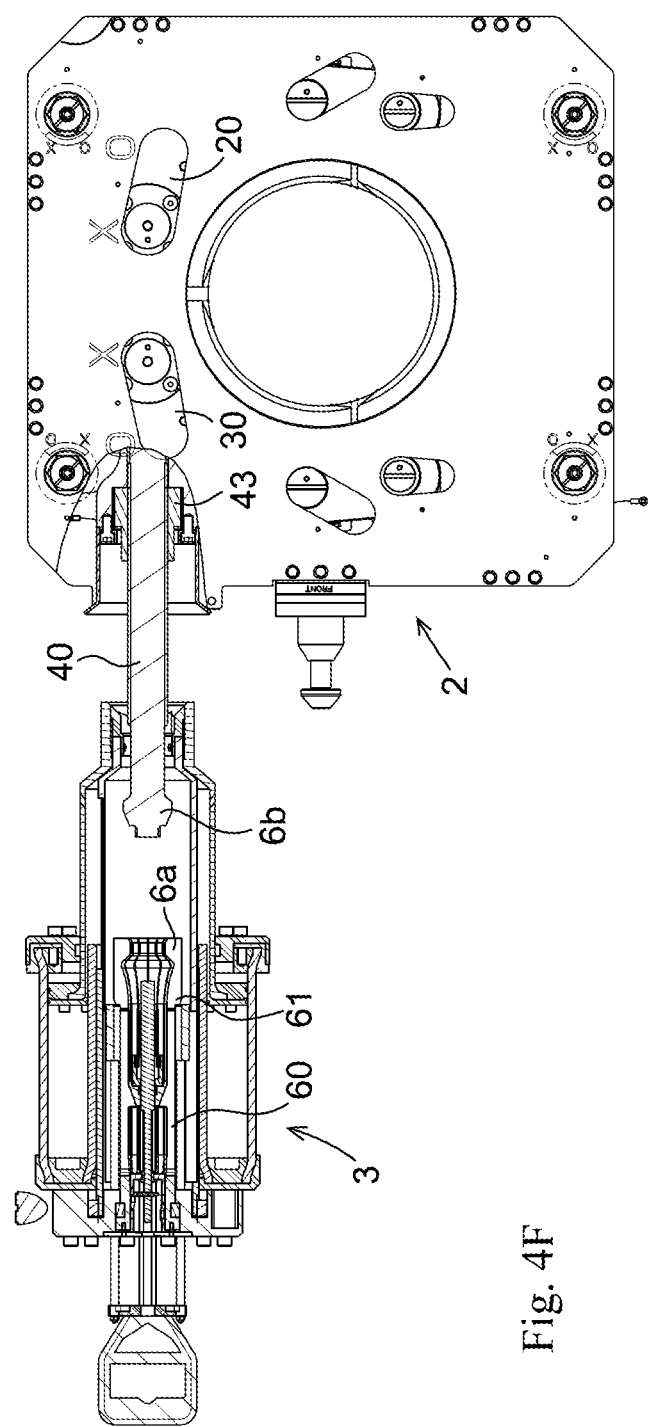

Two tubular members 5a, 5b to be connected to each other by means of a clamp connector arrangement 1 of an embodiment of the present invention are positioned end-to-end with opposite ends 4A, 4B of the tubular members received in the space formed between the base part 10 and the clamping elements 20, 30 of the clamp connector 2. The clamping elements 20, 30 are in the open position (see FIG. 3A) when the ends 4A, 4B of the tubular members are inserted into said space. The hydraulic tool 3 is then moved towards the clamp connector 2 by means of an ROV (not shown), in such a manner that the front part 79 of the tubular body 76 of the hydraulic power unit 70 is axially received in the guide funnel 54 of the spacer sleeve 50 and the bevelled guide surface on the second coupling member 6b at the outer end 42 of the operating shaft 40 makes contact with the front end of the coupling fingers 61, as illustrated in FIG. 4A. The hydraulic tool 3 is then pushed further forwards until the contact surface 78 at the front end of the tubular body 76 has made contact with the corresponding contact surface 58 on the spacer sleeve 50, the socket 82 has been engaged with the locking nut 43 and the second coupling member 6b has been received in the recesses 65 of the coupling fingers 61, as illustrated in FIG. 4B. This position corresponds to the position illustrated in FIG. 3B. During the movement of the hydraulic tool 3 from the position illustrated in FIG. 4A to the position illustrated in FIG. 4B, the actuating rod 104 is pushed rearwards in relation to the pulling element 60 and the cylindrical body 102, and the locking disc 100 is thereby rotated from the above-mentioned first position to the above-mentioned second position in the manner described above. Thereafter, the handle 92 is pushed forwards by means of the ROV, from the position illustrated in FIGS. 3B and 4B to the position illustrated in FIGS. 3C and 4C, to thereby move the locking member 91 from the unlocking position illustrated in FIG. 4B to the locking position illustrated in FIG. 4C. In the next step, hydraulic fluid is fed into the above-mentioned first chamber 75a of the piston cavity 74 in order to push the axially moveable part 71 of the hydraulic power unit 70 rearwards and the tubular body 76 of the hydraulic power unit forward from the position illustrated in FIG. 4C to the position illustrated in FIG. 4D. During this rearward movement of the axially moveable part 71 of the hydraulic power unit 70, and forward movement of the tubular body 76 of the hydraulic power unit 70, the pulling element 60 will exert a pulling force on the operating shaft 40 and the tubular body 76 will exert a pushing force on the spacer sleeve 50, and thereby force the first and second clamping elements 20, 30 into the closed position (see FIG. 3D) and bring the operating shaft 40 into a pre-tensioned condition. During the pulling of the operating shaft 40 and the pushing against the contact surface 58 on the spacer sleeve 50, the drive motor 83 rotates the actuating member 81 so as to make the actuating member 81 rotate the locking nut 43 and thereby allow the locking nut 43 to hold its position in relation to the shoulder 53 on the spacer sleeve 50. The operating shaft 40 is locked in the pre-tensioned condition by means of the locking nut 43. Hereby, the first and second clamping elements 20, 30 are locked in the closed position and thereby keep the ends 4A, 4B of the tubular members 5a, 5b tightly clamped to each other. Thereafter, the handle 92 is pulled rearwards by means of the ROV, from the position illustrated in FIGS. 3D and 4D to the position illustrated in FIGS. 3E and 4E, to thereby move the locking member 91 from the locking position illustrated in FIG. 4D to the unlocking position illustrated in FIG. 4E and at the same time move the wedge member 94 into contact with the inclined inner surfaces 67 on the coupling fingers 61. The handle 92 is then pushed a short distance further rearwards by means of the ROV so as to make the wedge member 94 act on the inclined inner surfaces 67 on the coupling fingers 61 in order to force the coupling fingers 61 apart and thereby allow the coupling fingers 61 to slide out of engagement with the second coupling member 6b upon a movement of the hydraulic tool 3 rearwards away from the spacer sleeve 60, as illustrated in FIG. 4F. The hydraulic tool 3 may then be completely disconnected from the operating shaft 40. FIG. 3F illustrates the clamp connector 2 in the closed position after the removal of the hydraulic tool 3.

The hydraulic tool 3 may of course also be used for a later release of the clamp connector 2 from the tubular members 5a, 5b.

The invention is of course not in any way restricted to the embodiments described above. On the contrary, many possibilities to modifications thereof will be apparent to a man with ordinary skill in the art without departing from the basic idea of the invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A hydraulic tool for use with a clamp connector of the type where a first clamping element and a second clamping element of the clamp connector are pivotable towards each other into a closed position by exerting a pulling force on an outer end of an operating shaft, which is fixed to a first trunnion member pivotally mounted to the first clamping element and which is displaceably connected to a second trunnion member pivotally mounted to the second clamping element, and a simultaneous pushing force on a spacer sleeve fixed to said second trunnion member, and where said first and second clamping elements are lockable in said closed position by tightening a locking nut against a shoulder on a spacer sleeve which surrounds a section of the operating shaft and which is connected to the second trunnion member, wherein the locking nut is in threaded engagement with an external thread on the operating shaft, the hydraulic tool comprising:
a pulling element configured for releasable engagement with the outer end of the operating shaft; and
a hydraulic power unit for moving the pulling element in an axial direction in relation to the spacer sleeve so as to allow the hydraulic tool to exert a pulling force on the operating shaft and a pushing force on the spacer sleeve and thereby pivot the first and second clamping elements into the closed position and bring the operating shaft into a pre-tensioned condition, wherein the hydraulic tool is provided with a torque unit, which comprises:
a rotatable actuating member, which is provided with a socket (82) configured for releasable engagement with the locking nut; and
a drive motor for rotating the actuating member so as to allow the actuating member to rotate the locking nut and thereby move it into engagement with said shoulder on the spacer sleeve in order to lock the operating shaft in said pre-tensioned condition and thereby lock the first and second clamping elements in the closed position.

2. The hydraulic tool according to claim 1, wherein:
the actuating member has the form of a hollow casing, wherein the socket is provided at a front end of the actuating member; and the pulling element is located in an inner space of the actuating member and connected to the hydraulic power unit via a connecting member, which is fixed to an axially moveable part of the hydraulic power unit and located at a rear end of the actuating member, wherein the actuating member is rotatable in relation to the pulling element and the connecting member.

3. The hydraulic tool according to claim 2, wherein the actuating member is telescopically extendable so as to allow the length of the actuating member to vary in dependence on the axial movement of said axially moveable part of the hydraulic power unit in relation to the spacer sleeve.

4. The hydraulic tool according to claim 2, wherein the drive motor (83) is mounted to the connecting member.

5. The hydraulic tool according to claim 2, wherein the torque unit comprises a transmission mechanism for transmitting torque from an output shaft of the drive motor to the actuating member, wherein the transmission mechanism comprises a ring gear which is fixed to the actuating member at the rear end thereof.

6. The hydraulic tool according to claim 2, wherein the hydraulic power unit comprises a cylinder housing and an annular piston received in an annular piston cavity in the cylinder housing, wherein the piston cavity and the piston surround the actuating member.

7. The hydraulic tool according to claim 6, wherein the cylinder housing forms part of said axially moveable part of the hydraulic power unit.

8. The hydraulic tool according to claim 7, wherein:
the hydraulic power unit comprises a tubular body which is fixed to the piston and extends through an opening at a front end of the cylinder housing, wherein a contact surface at a front end of the tubular body is configured to be in contact with a corresponding contact surface on the spacer sleeve when the pulling element is in engagement with the outer end of the operating shaft and the socket of the actuating member is in engagement with the locking nut; and
the actuating member extends through the tubular body and is rotatable in relation to it.

9. The hydraulic tool according to claim 1, wherein the pulling element is provided with a first coupling member which is configured for engagement with a corresponding second coupling member arranged at the outer end of the operating shaft.

10. The hydraulic tool according to claim 9, wherein:
the first coupling member comprises several coupling fingers which are distributed about a center axis of the pulling element and configured to surround the second coupling member when the first and second coupling members are in engagement with each other;
the coupling fingers are moveable in relation to each other in a radial direction, to thereby allow the coupling fingers to be connected to the second coupling member by flexing radially outwards in relation to each other and sliding into engagement with the second coupling member when the pulling element is pushed against the outer end of the operating shaft; and
the hydraulic tool comprises a sleeve-shaped locking member which surrounds the coupling fingers and which is axially moveable in relation to the coupling fingers between an unlocking position, in which the coupling fingers are moveable in relation to each other in a radial direction outwards and thereby may be engaged with or disengaged from the second coupling member, and a locking position, in which the locking member prevents the coupling fingers from moving in relation to each other in a radial direction outwards and thereby prevents the coupling fingers from being disengaged from the second coupling member.

11. The hydraulic tool according to claim 10, wherein that the locking member is connected to a handle, by means of which the locking member may be axially moved between said unlocking position and locking position.

12. The hydraulic tool according to claim 11, wherein the handle is connected to the locking member via connecting rods which are slidably mounted to the connecting member and extend in the axial direction of the pulling element on the outside thereof.

13. The hydraulic tool according to claim 11, wherein:
the hydraulic tool comprises a wedge member, which is connected to the handle so as to be axially moveable in relation to the coupling fingers together with the locking member; and
the wedge member is received in a space between the coupling fingers and configured to act on an inclined inner surface of each coupling finger in order to force the coupling fingers to move in relation to each other in a radial direction outwards when the locking member is moved from the locking position to the unlocking position and thereby facilitate a disconnection of the coupling fingers from the second coupling member.

14. A clamp connector arrangement for connecting and securing an end of a tubular member to an abutting end of another tubular member, the clamp connector arrangement comprising a clamp connector with:
a first clamping element, which has a hinged first end and an opposite second end;
a second clamping element, which has a hinged first end and an opposite second end;
a first trunnion member pivotally mounted to the first clamping element at said second end thereof;
a second trunnion member pivotally mounted to the second clamping element at said second end thereof;
an operating shaft which has an inner end and an opposite outer end, wherein the operating shaft is fixed to the first trunnion member at its inner end and displaceably connected to the second trunnion member;
a locking nut, which is in threaded engagement with an external thread on the operating shaft at a position between the outer end of the operating shaft and the second trunnion member; and
a spacer sleeve which surrounds a section of the operating shaft and which is connected to the second trunnion member,
wherein that the clamp connector arrangement comprises a hydraulic tool according to any of claims 1-13, wherein the hydraulic tool is configured to exert a pulling force on said operating shaft and a pushing force on said spacer sleeve, by means of the pulling element and the hydraulic power unit, in order to bring the operating shaft into a pre-tensioned condition while moving said second ends of the clamping elements towards each other and thereby pivoting the clamping elements into a closed position in engagement with the ends of said tubular members and to rotate said locking nut, by means of the torque unit, and thereby move it into engagement with a shoulder on the spacer sleeve in order to lock the operating shaft in said pre-tensioned condition and thereby lock the first and second clamping elements in said closed position.

* * * * *